(12) United States Patent
Levari et al.

(10) Patent No.: US 9,116,946 B2
(45) Date of Patent: Aug. 25, 2015

(54) SYSTEM AND METHOD FOR INTERACTING WITH A PLURALITY OF DATA SOURCES

(75) Inventors: Doron Levari, Newton, MA (US); Liran Zelkha, Brookline, MA (US)

(73) Assignee: SCALEBASE INC., Newton, MA (US)

( * ) Notice: Subject to any disclaimer, the term of this patent is extended or adjusted under 35 U.S.C. 154(b) by 88 days.

(21) Appl. No.: 13/077,526

(22) Filed: Mar. 31, 2011

(65) Prior Publication Data

US 2011/0246480 A1  Oct. 6, 2011

Related U.S. Application Data

(60) Provisional application No. 61/320,575, filed on Apr. 2, 2010.

(51) Int. Cl.
*G06F 17/30* (2006.01)

(52) U.S. Cl.
CPC .... *G06F 17/30412* (2013.01); *G06F 17/30489* (2013.01)

(58) Field of Classification Search
USPC .......................................... 707/999.005, 770
See application file for complete search history.

(56) References Cited

U.S. PATENT DOCUMENTS

| | | | |
|---|---|---|---|
| 5,675,791 A | 10/1997 | Bhide et al. | |
| 5,799,306 A * | 8/1998 | Sun et al. | 707/999.01 |
| 6,801,921 B2 | 10/2004 | Tsuchida et al. | |
| 6,950,848 B1 | 9/2005 | Yousefi'zadeh | |
| 7,644,087 B2 | 1/2010 | Barkai et al. | |
| 7,890,463 B2 | 2/2011 | Romem et al. | |
| 8,055,647 B2 * | 11/2011 | Takatsuka et al. | 707/713 |
| 2002/0198872 A1 * | 12/2002 | MacNicol et al. | 707/3 |
| 2005/0021511 A1 | 1/2005 | Zarom | |
| 2006/0129528 A1 | 6/2006 | Miyamoto et al. | |
| 2007/0025351 A1 | 2/2007 | Cohen | |
| 2007/0203910 A1 | 8/2007 | Ferguson et al. | |
| 2007/0288530 A1 | 12/2007 | Romem et al. | |
| 2008/0140696 A1 * | 6/2008 | Mathuria | 707/999.102 |
| 2009/0012932 A1 * | 1/2009 | Romem et al. | 707/999.001 |
| 2009/0144632 A1 * | 6/2009 | Mendez | 715/738 |
| 2009/0248753 A1 * | 10/2009 | Tsai et al. | 707/999.007 |
| 2010/0017395 A1 * | 1/2010 | Wayn et al. | 707/E17.014 |
| 2010/0082540 A1 | 4/2010 | Isaacson et al. | |
| 2010/0131490 A1 | 5/2010 | Lamb et al. | |
| 2010/0223562 A1 | 9/2010 | Carapella et al. | |
| 2011/0173219 A1 * | 7/2011 | Bent et al. | 707/769 |

OTHER PUBLICATIONS

Stack Overflow, 'What is the Difference Between Group by and Order by in sql', Aug. 14, 2009. Retrieved Sep. 26, 2012 from http://stackoverflow.com/questions/1277460/what-is-the-difference-between-group-by-and-order-by-in-sql.*
US Office action mailed Jun. 23, 2013 for U.S. appl. No. 13/077,523.

* cited by examiner

*Primary Examiner* — Apu Mofiz
*Assistant Examiner* — Cindy Nguyen
(74) *Attorney, Agent, or Firm* — Pearl Cohen Zedek Latzer Baratz LLP

(57) ABSTRACT

System and method for interacting with a plurality of data sources are provided. A request may be parsed and an identification parameter identifying a data set may be determined. A field included in the request may be designated as a distribution key. At least one data source may be selected based on a value associated with the distribution key. At least a portion of the request may be sent to a selected data source. Other embodiments are described and claimed.

20 Claims, 3 Drawing Sheets

SYSTEM AND METHOD FOR INTERACTING WITH A PLURALITY OF DATA SOURCES

CROSS-REFERENCE TO RELATED APPLICATIONS

This application claims the benefit of U.S. Provisional Patent Application Ser. No. 61/320,575, filed on Apr. 2, 2010, which is incorporated in its entirety herein by reference.

BACKGROUND OF THE INVENTION

A large and increasing portion of the information handled in today's modern environment is digital. For example, many organizations, service providers, institutions, and establishments store, handle and manipulate most of their information in digital forms. Typically, databases are used to store and retrieve information. Various systems, methods and/or applications may be used to store, retrieve and/or manipulate data in databases.

At some point, as the quantity of digital information stored on, and retrieved from a database increases, a capacity of the database may no longer suffice. For example, storage and/or computational capacities of a database may be exhausted. In such cases, more databases or other data sources may be added to a site or system. Typically, information may be duplicated on a number of physical or logical data sources and a request for information may be directed to a data source that may be selected based on a load balancing or other scheme.

However, duplicating information on a number of data sources (also known as mirroring) may have a number of drawbacks. For example, storage utilization may be far from optimal when duplicating information on several data sources. Other methods directed to distributing data over a number of data sources may require clients to determine a location of a data item prior to requesting the data item, e.g., determine which database stores a specific item and interact with the specific database.

SUMMARY OF EMBODIMENTS OF THE INVENTION

A system and a method according to embodiments of the invention may enable interacting with a plurality of data sources as if the plurality of data sources are a single entity. Data sets (e.g., tables) may be distributed between a number of data sources (e.g., databases). A parser may parse a request from a client and extract one or more parameters from the request. A predefined field or parameter in a request may be designated as a distribution key. A data source may be selected based on a value of a distribution key, and a request, or part thereof may be sent to a selected data source by a distributor. An aggregator may aggregate a number of responses received from a number of data sources to generate a response that may be sent to a client.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
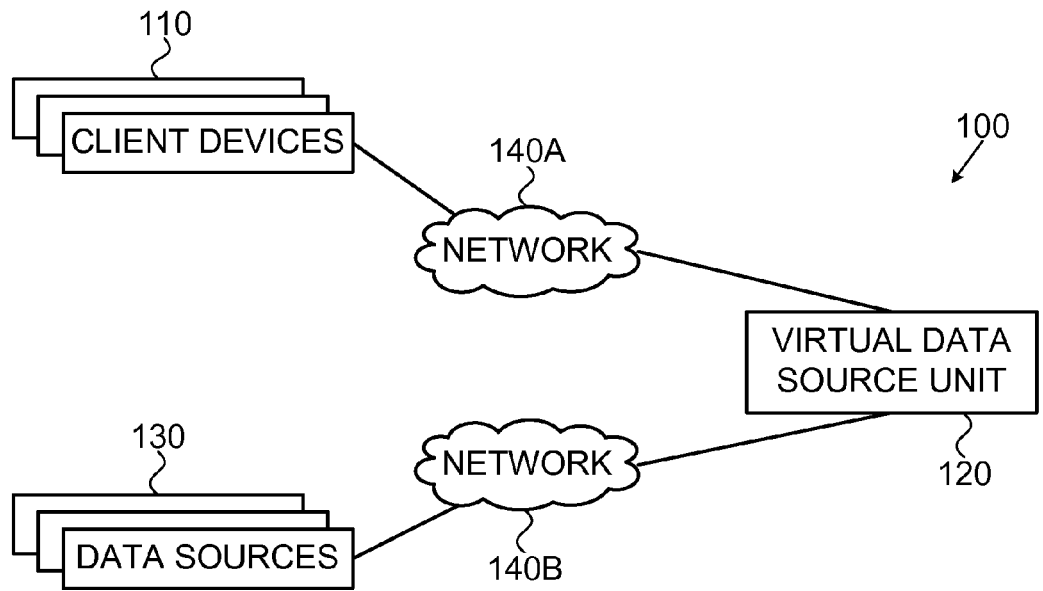
FIG. 1 shows a block diagram of an exemplary system according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which shows a schematic block diagram of an exemplary system 100 according to embodiments of the invention. System 100 may include client devices 110, networks 140A and 140B, a virtual data source unit 120, and a plurality of data sources 130.

According to embodiments of the present invention, client devices 110 may be client computing devices, e.g., computing devices owned and operated by private individuals. For example, client devices 110 may be or may include a personal computer, a desktop computer, a laptop computer, a notebook computer, a terminal, a workstation, a server computer, a tablet computer, a network device, a household appliance, or any other applicable computing device. Client devices 110 need not necessarily be conventional computers. For example, any one of client devices 110 may be a telephone, a cellular phone, a smartphone or another communication device, or it may be a Personal Digital Assistant (PDA)

device, an MPEG-1 Audio Layer 3 (MP3) player, a camera, a Global Positioning System (GPS) device and the like. Generally, any one of client devices 110 may be any computing device capable of interacting with a data source, e.g., store/retrieve data on/from a database over a network. For the sake of simplicity, a single client device 110 may be referred to herein, however, it will be understood that a large number of client devices 110 may exist in a typical setup according to embodiments of the invention.

Any of data sources 130 may be or include any suitable data source or data storage server, unit or system, including any applicable applications, e.g., database management system (DBMS) applications, attached storage systems and the like. For example, some of data sources 130 may be commercial database systems, while others may be proprietary systems. Any suitable storage device, system, or unit, may be operatively connected to data sources 130. A storage connected to a data source may be or may include, for example, a hard disk drive, a solid state drive (SSD), a Compact Disk (CD) drive and/or media, a CD-Recordable (CD-R) drive and/or media, a Redundant Array of Independent Disks (RAID) storage systems or any other suitable removable and/or fixed storage unit. It will be recognized that the scope of the present invention is not limited or otherwise affected by the type, nature, operational and/or design aspects of storage devices or systems used for storing information, e.g., by a data source.

Networks 140A and 140B may be, comprise, or be part of a private or public data network, for example, one communicating using internet protocol (IP), such as the internet. Networks 140A and 140B may alternatively or additionally be, comprise, or be part of a cellular network capable of communicating data (rather than merely voice), for example, a 3G or 4G network. For example, networks 140A and 140B may include or comprise an IP network such as the internet, a cellular network capable of communicating data, and any equipment for bridging or otherwise connecting such networks as known in the art. In addition, networks 140A and 140B may be, comprise, or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, any combination of the preceding and/or any other suitable communication network. It will be recognized that embodiments of the invention are not limited by the nature, number or type of networks used.

For example, in some embodiments, network 140A may be a public network, e.g., the internet, and network 140B may be an internal or private network, e.g., internal to a data center and/or maintained by a private entity, e.g., a service provider. As shown, virtual data source unit 120 may be connected to both 140A and 140B networks. Accordingly, virtual data source unit 120 may interact with client devices 110 over a public network and with data sources 130 over a private network. In other embodiments, a single network may enable communication between components and/or devices shown in FIG. 1. In yet other embodiments, more networks may be used.

Virtual data source unit 120 may be or may comprise software, hardware, firmware or any combination thereof. For example, virtual data source unit 120 may be a software application executed on a suitable, possibly specifically designed and manufactured computing device. In some embodiments, virtual data source unit 120 may be or may include dedicated hardware that may include a processor or controller and a non-transitory memory where instructions may be stored. Other hardware components may be included in virtual data source unit 120, for example, a network interface card, and user interface (UI) components such as keyboard or a pointing device, and the like.

Figure 2:
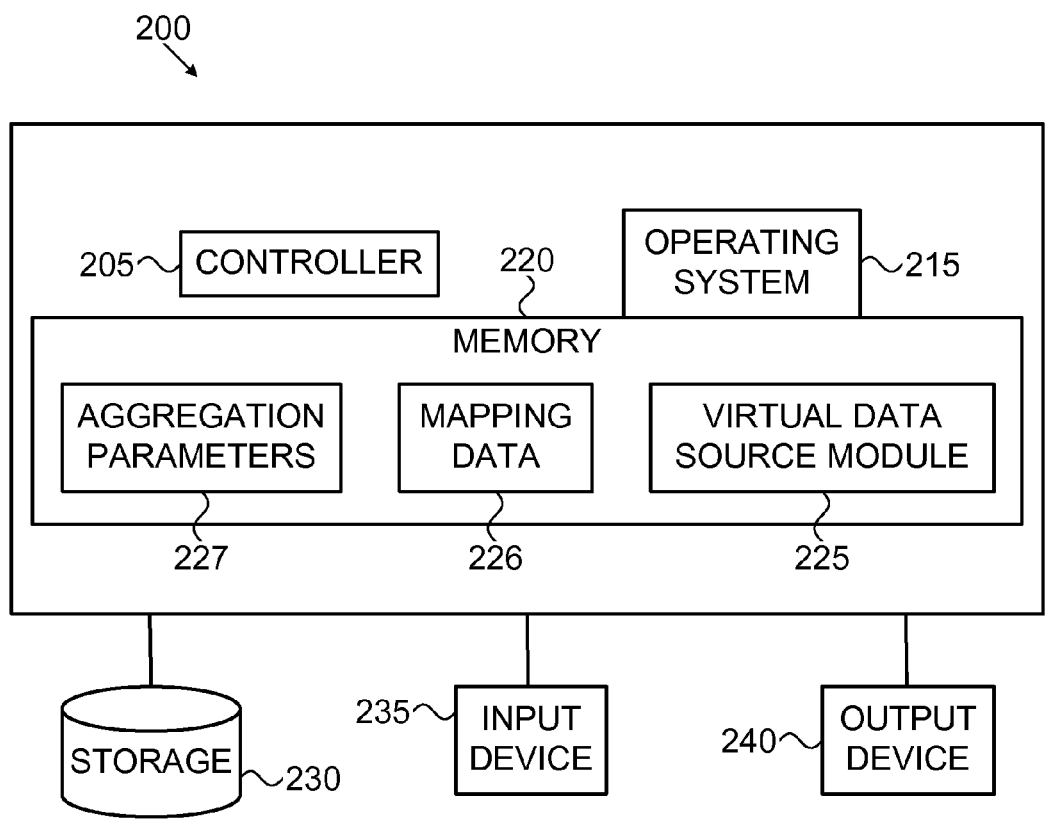
FIG. 2 shows a high level block diagram of an exemplary virtual data source according to embodiments of the present invention.

Reference is now made to FIG. 2, which shows a high level block diagram of an exemplary virtual data source 200 according to embodiments of the present invention. Virtual data source 200 may include a controller 205, which may be, for example, a central processing unit processor (CPU), a chip, or any suitable computing or computational device, an operating system 215, a memory 220, a storage 230, an input device 235 and an output device 240. Operating system 215 may be or may include any code segment designed and/or configured to perform tasks involving coordination, scheduling, arbitration, supervising, controlling or otherwise managing operation of virtual data source 200, for example, scheduling execution of programs. Operating system 215 may be a commercial operating system or it may be a proprietary operating system configured to perform some of the operations described as performed herein by virtual data source 200. For example, operating system 215 may interact with a server to obtain addresses of data sources 130, (e.g., obtain their internet protocol (IP) addresses), interact with, or serve as an agent of, a remote management task, or perform any other management or other tasks.

Memory 220 may be or may include a non-transitory readable medium, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 220 may be or may include a plurality of, possibly different memory units.

Virtual data source module 225 may be any executable code, e.g., an application, a program, a process, task or script. Virtual data source module 225 may be executed by controller 205 possibly under control of operating system 215. Storage 230 may be or may include, for example, a hard disk drive, a floppy disk drive, a Compact Disk (CD) drive, a CD-Recordable (CD-R) drive, a universal serial bus (USB) device or other suitable removable and/or fixed storage unit. Mapping data 226 may include any data, information or parameters usable, by virtual data source module 225, to map a request to a data source, e.g., as described herein. For example, mapping data 226 may include a mapping of a data set to a master data source or mapping data 226 may include a mapping of a data set to a set of data sources in an array of data sources. Mapping data 226 may include a mapping of a parameter to a data source, for example, an index associated with a data source may be mapped to a specific data set or to a set of data sets. Mapping data 226 may include a designation of parameters or fields. For example, mapping data 226 may include a designation of a field in a request as a data distribution key.

Aggregation parameters 227 may include any data, information or parameters usable, by virtual data source module 225, to aggregate responses, e.g., as described herein. For example, aggregation parameters 227 may include parameters related to a number of threads used to send a number of portions of a request to a number data sources. Aggregation parameters 227 may include parameters indicating the format of a response that a client expects. For example, a sort, a merge, average or other calculations or operations that may be required to be performed, e.g., when aggregating responses received from data sources into a response to be sent to a client may all be included in aggregation parameters 227, for example, based on parsing, and/or extracting information in, a request received from a client. Aggregation parameters 227 may be updated, modified or otherwise manipulated by any relevant entity, e.g., any component or module in system 300. For example, parser 310, mapping module 315, distributor 320, execution module 330 and/or aggregator 340 (described herein with respect to FIG. 3) may all access, read, write or otherwise manipulate or use data in aggregation parameters 227.

Input devices 235 may be or may include a mouse, a keyboard, a touch screen or pad or any suitable input device. It will be recognized that any suitable number of input devices may be operatively connected to virtual data source 200 as shown by block 235. Output devices 240 may include one or more displays, speakers and/or any other suitable output devices. It will be recognized that any suitable number of output devices may be operatively connected to virtual data source 200 as shown by block 240. Any applicable input/output (I/O) devices may be connected to virtual data source 200 as shown by blocks 235 and 240. For example, a network interface card (NIC), a printer or facsimile machine, a universal serial bus (USB) device or external hard drive may be included in input devices 235 and/or output devices 240.

Accordingly, some embodiments may be provided in a computer program product that may include a non-transitory machine-readable medium such as memory 220, stored thereon instructions (e.g., virtual data source module 225), which may be used to program a computer, or other programmable devices, to perform methods as disclosed herein. Embodiments of the invention may include an article such as a computer or processor such as controller 205, non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a network device, or any other suitable computing device.

The below is a general description of terms used herein. Data manipulation language (DML) as used in the art is a family of data languages used by computer programs and/or database users to insert, delete and update data in a Data Source. Non-exclusive examples of DMLs include SQL (for example, INSERT, UPDATE, and DELETE), IMS, CODASYL, and others. Storage area network (SAN) is an architecture that enables attaching remote computer storage devices (such as disk arrays, tape libraries, optical jukeboxes, and the like) to servers in a way that the such attached devices appear, e.g., to an operating system, as locally attached or connected. A SAN typically uses its own network of storage devices that are generally not accessible through a regular or common network by regular or common devices. Cloud computing generally relates to way of computing using a network, e.g., the Internet, that broadly shares computer resources instead of using software or storage on a local PC.

A database JOIN operation also known as SQL Join, combines records from two or more tables in a database. A JOIN operation creates a set that can be saved as a table or used as is. A JOIN is a means for combining fields from two tables by using values common to each. ANSI standard SQL specifies four types of JOIN's: INNER, OUTER, LEFT, and RIGHT. In special cases, a table (base table, view, or joined table) can JOIN to itself in a self-join.

A transaction or a database transaction may be or may comprise a unit of work performed with relation to a data source, e.g., a database. A transactions related to a database environment may provide reliable units of work that allow correct recovery from failures and further keeping a database consistent even in cases of system failure, e.g., when execution stops (completely or partially) possibly leaving uncompleted procedures. A transactions related to a database environment may provide isolation between programs accessing a database concurrently. Such isolation, may enable concurrency, e.g., allowing a number of applications to concurrently access a single database. A database transaction is typically atomic, consistent, isolated and durable. Database practitioners often refer to these properties (Atomic, Consistent, Isolated, Durable) of database transactions using the acronym ACID.

As referred to herein, a data source may be any source of data, e.g., a database, a server or a storage system. A data source may include discrete portions of data from any of a variety of sources. A database may generally be an integrated collection of logically-related records or files consolidated into a common pool. A database may provide data for one or more multiple uses. The source of data may be any kind of content. The data in the database may be related relationally, hierarchically, or in any other manner. In some cases, an array of data sources may be used to store and/or manipulate data. According to some embodiments of the invention, each data source in an array of data sources may be assigned or otherwise associated with an identifier that may be unique within the array. For example, each data source in an array may be assigned an index that may be an integer number running from zero ("0") to the number of data sources in the array minus one. For example, data sources in a data source array that includes ten data sources may be assigned indices from zero ("0") to nine ("9").

As referred to herein, a data set may be a structure that holds data. A data set may include both metadata (e.g., structural information) and actual data. For example, metadata may be information related to an arrangement of items in a structure, e.g., in a table or other container of data. Using metadata, an application may locate specific items in a data set. Typically, a structure or arrangement of a data set is unchanged over long periods of time while actual data or content may be dynamic. However, metadata may be changed, for example, a column may be added to an existing table, such addition may be caused, for example, by a specific command to a data source that may cause a modification of a data set structure. Typically though not necessarily, several data sets are included in a single data source. A non-exclusive example for data set is a table within a database.

According to embodiments of the invention, a distributed data set may be a data set distributed across several data sources. For example, a first subset of rows in a table may be stored and/or managed by a first data source and a second subset of rows in the same table may be stored and/or managed by a second data source. Accordingly, if a request or operation is related to the first subset, the first data source may be interacted with and, if the request or operation is related to the second subset, the second data source may be interacted with. Generally, a data set may be distributed, wherein the content or information in the data set is distributed between, among or across a number of data sources or the data set may be non-distributed. A non-distributed data set may be stored as a whole or in its entirety on a data source. It will be noted that a non-distributed data set may be duplicated (or mirrored) on or at a number of data sources. However, when a non-distributed data source is duplicated or mirrored, the entire data set content may be found on each mirrored data source, thus, although duplicated, the data set may still be non-distributed.

In some embodiments, the structure, arrangement or other attributes or aspects of a data set (e.g., as reflected in the associated metadata) may be left unchanged, e.g., when a non-distributed data set is distributed, e.g., when the content of the data set is divided between a number of data sources. As referred to herein, a global data set may be a non-distributed data set. Accordingly, a information or content of a global data set may reside in one and only one data source, or, in other cases, content of a global data set may reside equally in a set of data sources, e.g., duplicated on a number of databases. Accordingly, in order to generate or obtain an entire or complete distributed data set, content obtained from a number of data sources may need to be joined, merged, concatenated or otherwise combined. In contrast, an entire or complete non-distributed (e.g., global) data set may be obtained from a single data source.

A master data source may be a data source that stores specific information or, in some cases, selected data sets. For example, a master data source may store information related to metadata even though it may not store the actual data (which may be stored on regular, non-master data sources). For example, an application may need to examine metadata related to a data set prior to generating a request from a database, e.g., in order to determine which fields, rows or columns in a table to request. In order to obtain metadata related to data sets stored in an array of data sources, an application may interact with a master data source and be provided, by the master data source, metadata.

Other examples of information that may be maintained and/or stored by a master data source may be a version of a database application (e.g., the version of the DBMS application used to manage a database). Addresses, e.g., IP addresses of specific data sources or of a gateway used to access an array of data sources may be another example of information, that may be referred to as metadata, that may be stored in, and provided by, a master data source. In some embodiments, a master data source may store a non-distributed (global) data set. For example, a global data set may need to be duplicated on a number of servers or data sources, however, for various reasons (e.g., maintenance or fault) a global data set may not be mirrored on all data sources as configured, planned or desired. In such cases, possibly as a backup measure, a global data set may be stored on a master data source.

According to embodiments of the invention, an element, component or part of a data set may be designated as a data distribution key. For example, a data set may be a table having forty (40) rows, and a row number may be defined or designated as the data distribution key for the table. In such exemplary case, a mapping between row numbers in the table and data sources may be created. For example, information in rows one to twenty (1 to 20) in the table may be stored on a first one or set of data sources and information in rows twenty one to forty (21 to 40) may be stored on a second one, or set of data sources. Using such mapping, when a request for information in the table is received, embodiments of the invention may examine the request, and upon determine the data set from which information is to be retrieved is the table in the current example, a mapping (or any relevant calculation) may be examined and/or performed to determine the data distribution key.

In the example above, the mapping may be found to be according to row numbers. Accordingly, a row number (which will typically appear in a request from a table) in the request will be designated as the data distribution key. For example, in a first query related to the table in the current example, a row number of fifteen (15) may be indicated. In such case, 15 may be designated as the data distribution key value. Accordingly, since rows 1 to 20 are mapped to the first data source (or the first data sources set), the request may be forwarded to the indicated first data source or set of data sources. Accordingly, by designating an element in a data set as a data distribution key and distributing information in the data set based on values that may be assumed by the designated element (in its capacity as a data distribution key), embodiments of the invention may enable efficiently distributing data sets across multiple data sources.

In some embodiments, the data distribution key may be a part or an element of a data set, e.g., a column or row in a table and, accordingly, the data distribution key value may be determined by observing the value of the part or element in the data set, e.g., the row or column number. Using a mapping or any calculation, a data source may be picked based on the value of the data distribution key. In other embodiments or cases, a complex data distribution key may be used. For example, the data distribution key may not necessarily be a part or an element of the related data set. For example, the data distribution key of data set "A" may be an element in data set "B" or may be part of, or stored in any storage construct. For example, a mapping related to a first data set may comprise a pointer or other reference to a second data set. Accordingly, upon receiving a request related to the first data set, embodiments of the invention may examine a second data set to determine the data distribution key and or data distribution key value. For example, a table may indicate that a value to be used as a distribution key for a first (distributed) data set is to be determined based on a second data set, the table may further indicate a field or entry in the second data set. Accordingly, the second data set may be accessed, a value in an indicated field or location may be obtained and used as a value of a distribution key that may be used to locate distributed data of the first data set.

A specific data distribution key value may be mapped to a set of data sources based on various schemes or it may be mapped to a specific data source. A mapping of a data distribution key value to a specific data source may be based on any scheme, calculation or computation or it may be straight forward. For example, data sources in a data source array (e.g., data sources 130) may be assigned indices and a value of a data distribution key may be used as an index. For example, in a simplified case, a table may have 10 rows and an array of data sources may include 10 data sources. In such simple case, a row number may be designated as the data distribution key, clearly, the values that may be assumed by the data distribution key are 1 to 10 as there are 10 rows in the table.

Accordingly, a value of the data distribution key that may be any number between 1 to 10 may be used as an index of the data source, e.g., without any computation or calculation.

Clearly, the simple mapping example above may be insufficient in many cases. Accordingly, embodiments of the invention may enable various methods or schemes and relevant devices or systems for determining or selecting a data source based on a value of a data distribution key. For example, distributor 320 (described herein with respect to FIG. 3) may perform various calculation or computations based on a value of a data distribution key to determine or select a data source. For example, a value of a data distribution key may be provided as input to a hash function that may provide a data source index or other reference or indication as output.

In one embodiment, a value of a data distribution key may be normalized and an index of a data source in a data source array may be calculated, e.g., by distributor 320, based on the normalized data distribution key value. For example, the "modulo" function may be used. For example, deriving a data source index may be according to:

"<data distribution key value>modulo <number of data sources in a data source array>".

For example, in an exemplary case where ten (10) data sources are used, such data sources may be assigned the indices of zero to 9 (0 to 9) respectively, and the function of:

sources may be assigned the indices of zero to 9 (0 to 9) respectively, and the function of:

"<data distribution key value>modulo <10>"

may be used to derive an index and/or select a data source. In this example, the function may yield any number between zero (0) to nine (9) that may be used as an index to one of the ten data sources according.

In another embodiment, a mapping table may be used, e.g., by distributor 320, to map data distribution key values to data sources. A simple mapping may map a data distribution key value to a data source, a more complex mapping may, for example, map a range of data distribution key values to a data source or a set of data sources. For example, a mapping may be according to ranges of data distribution key values. In such case, portions of a request may be sent to data sources selected based on the range of data distribution key values. For example, a first portion of a request may be sent to a first data sources selected based on a first value in a range of a data distribution key values and a second portion of a request may be sent to a second data sources selected based on a second value in a range of a data distribution key values.

In yet another embodiment, a combination of a hash or other function and a mapping may be used. For example, a modulo or other function may produce a value based on a value of a data distribution key and the value thus produced may be used, in conjunction with a mapping table or function to derive an index of, or other reference to, a data source. For example, rather than using a value produced by the modulo function as an index of a data source, the value produced by the modulo function may be provided to a mapping function or table to produce a reference to a data source.

Figure 3:
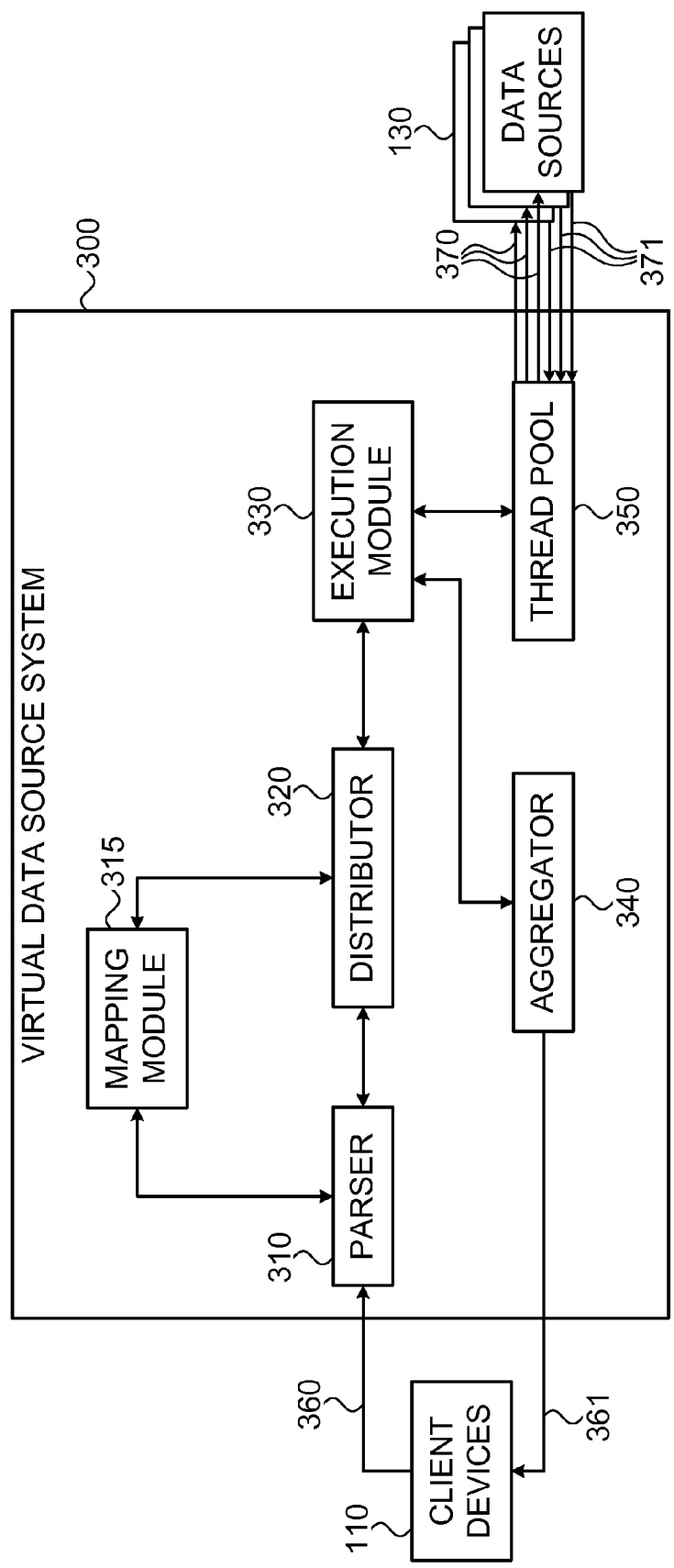
FIG. 3 shows a high level block diagram of an exemplary system according to embodiments of the present invention.

Reference is now made to FIG. 3 that shows a high level block diagram of an exemplary system 300 according to embodiments of the present invention. As shown, system 300 may include a parser 310, a mapping module 315, a distributor 320, an aggregator 340, an execution module 330 and a thread pool 350. As shown, system 300 may be operatively connected to a client devices 110 and to data sources 130, e.g., over a network such as network 140A and/or 140B.

As shown by 360, system 300 may receive input from a client that may be fed to parser 310. Parser 310 may be configured to parse an incoming request. For example, a request may be parsed into tokens. For example, parts, fields, entries or any relevant structures in a request may be identified and possibly converted into one or more tokens or parameters. As shown, output from parser 310 may be provided to distributor 320 and to mapping module 315. For example, one or more parameters extracted from a request may be provided to mapping module 315 and other information may be provided to distributor 320. Mapping module may perform any calculation or computation based on parameters and data received from parser 310 in order to determine a mapping as described herein, e.g., a mapping of a key to a data source, a mapping of a data set to a data source or a designation of a field in a request as a distribution key, e.g., based on a mapping table. Although not shown, mapping module 315 may include or may use mapping data. For example, mapping data 226 may be available to, and used by mapping module 315, e.g., when performing a mapping as described herein.

For example, one or more fields or tokens obtained from a request may be provided, by parser 310 to mapping module 315 and a payload of the request may be provided to distributor 320. Based on data or parameters (e.g., tokens) provided by parser 310, mapping module 315 may map a request to one or more data sources. Mapping module 315 may provide a mapping parameter to distributor 320 that may select a data source to which a request or other information is to be forwarded. Accordingly and as shown, distributor 320 may interact with mapping module 315, e.g., in order to receive a destination data source to which a request received by system 300 is to be forwarded.

In some embodiments, distributor 320 may include or may be operatively connected to a distribution engine (e.g., mapping module 315) that may be provided with a parameter (e.g., a token) and return, in response, a reference to a data source. For example, based on a data distribution key (further described hereinbelow) a distribution engine may provide a data source index or other reference enabling an identification of a data source in an array of data sources. Other modules or components, e.g., a distribution transaction manager that may coordinate handling multiple transactions may be included in system 300. It will be understood that various implementations may be applicable, however, for the sake of simplicity and clarity, neither all components nor all possible implementations or designs will be discussed herein. Accordingly, it will be understood that embodiments of the invention are not limited by the simplified description provided herein.

Execution module 330 may cause an execution of a task based. For example, based on data or parameters produced by parser 310 and/or distributor 320, execution module 330 may cause a transaction. For example, based on a selection of a data source and provided with at least a portion of a request, execution module 330 may cause the portion of a request to be sent to the selected data source and/or cause execution of any related tasks. Thread Pool 350 may be a pool of threads that may be executed by execution module 330. For example, a plurality of executions of a code segment may be executed, simultaneously or in parallel. For example, in order to send a request to a data source, a thread may be spawned and provided with the request and an identification of the target data source. A thread may send a request to a data source (e.g., acting as a client), may wait for a response and may return a received response to execution module 330 or aggregator 340.

Aggregator 340 may aggregate results arriving from data sources. For example, distributor 320 may determine that a first portion of a request is to be directed to a first data source and a second portion of the same request is to be sent to a second data source. For example, based on a number of values assigned to a data distribution key, a number of data sources may be selected to receive potions of a request. In other cases, a request may be used to generate a number of requests that may differ from one another, e.g., in one or more parameters. Consequently, execution module 330 may cause two threads in thread pool 350 to be executed. The two threads may each send their respective portions of the request to the designated data source, wait for and receive a reply and provide the reply to execution module 330 or to aggregator 340. Accordingly, aggregator 340 may receive two parts of a response. Aggregator 340 may aggregate, merge, combine or join the two parts of a response or otherwise generate a complete response from parts of a response. As shown, aggregator 340 may communicate an aggregated response to a client. Accordingly, system 300 may be transparent in the sense that a client or a client device may be unaware that rather than interacting with a data source (e.g., one of data sources 130, a database, a web server and the like) it is actually interacting with system 300.

An input as shown by 360 may be a request from a client, e.g., a request for information from a data source. A request received as shown by 360 may include a payload. For example, a payload may be a structured query language (SQL) command sent to a database. In other cases, a request may be a request for data results (e.g. an SQL Query) or a request for data manipulation, e.g. an SQL data manipulation language (DML) command such as UPDATE or INSERT.

As shown by 361, system 300 may produce output to a client, e.g., send information. For example, information sent as shown by 361 may be a response provided to a client in relation to a received request. A response as shown by 361 may include or contain a payload For example, in a case where the related request (as shown by 360) is a query request, a response 361 may be or may include the relevant queried data. In another case, e.g., a manipulation of information in a data source, the response may contain information related to the manipulation, e.g., number of rows affected, success or failure indications etc. In yet another case, e.g., when a request is related to a management of a data source, the response may include any relevant feedback, e.g., as expected by a management task.

As shown by 370, output from system 300 may be sent to a data source. For example, requests or part or portions of requests may be sent to data sources or a servers as shown by 370. As shown by 371, inputs may be received by system 300. For example, in response to requests sent as shown by 370, responses may be received as shown by 371. For the sake of clarity and simplicity, some components that may be included in system 300 are not shown. For example, a communication module or unit (e.g., a unit including a NIC and suitable drivers) configured to enable system 300 to communicate with client devices 110 and data sources 130 may be included in system 300 but not shown in FIG. 3.

Other modules or components that may be included in, or operatively connected to system 300 may be, for example, a management module. For example, a remote management application and/or device may interact, e.g., over network 140A, with an agent installed in system 300, e.g., a management or monitoring agent. For example, a monitoring agent may interact with other system 300 components to obtain any relevant information, and may provide monitoring and management information (such as statuses, statistics, etc.), typically but not exclusively to a management client that may be executed on a remote computing device. For example, parser 310, distributor 320, execution module 330 and aggregator 340 may all be monitored by a monitoring or management agent, module or unit and information related to their operations may be provided to a (possibly remote) management or monitoring application or system.

Such configuration may enable an administrator or manager to monitor, control, configure or otherwise supervise or manage system 300 from a remote location, e.g., by remotely sending and receiving management requests and responses. In some embodiments, system 300 may be, may include or may be implemented by virtual data source 200 described with reference to FIG. 2. Accordingly, any components or aspects described as included in, or related to virtual data source 200 may likewise be included in, or related to system 300.

Figure 4:
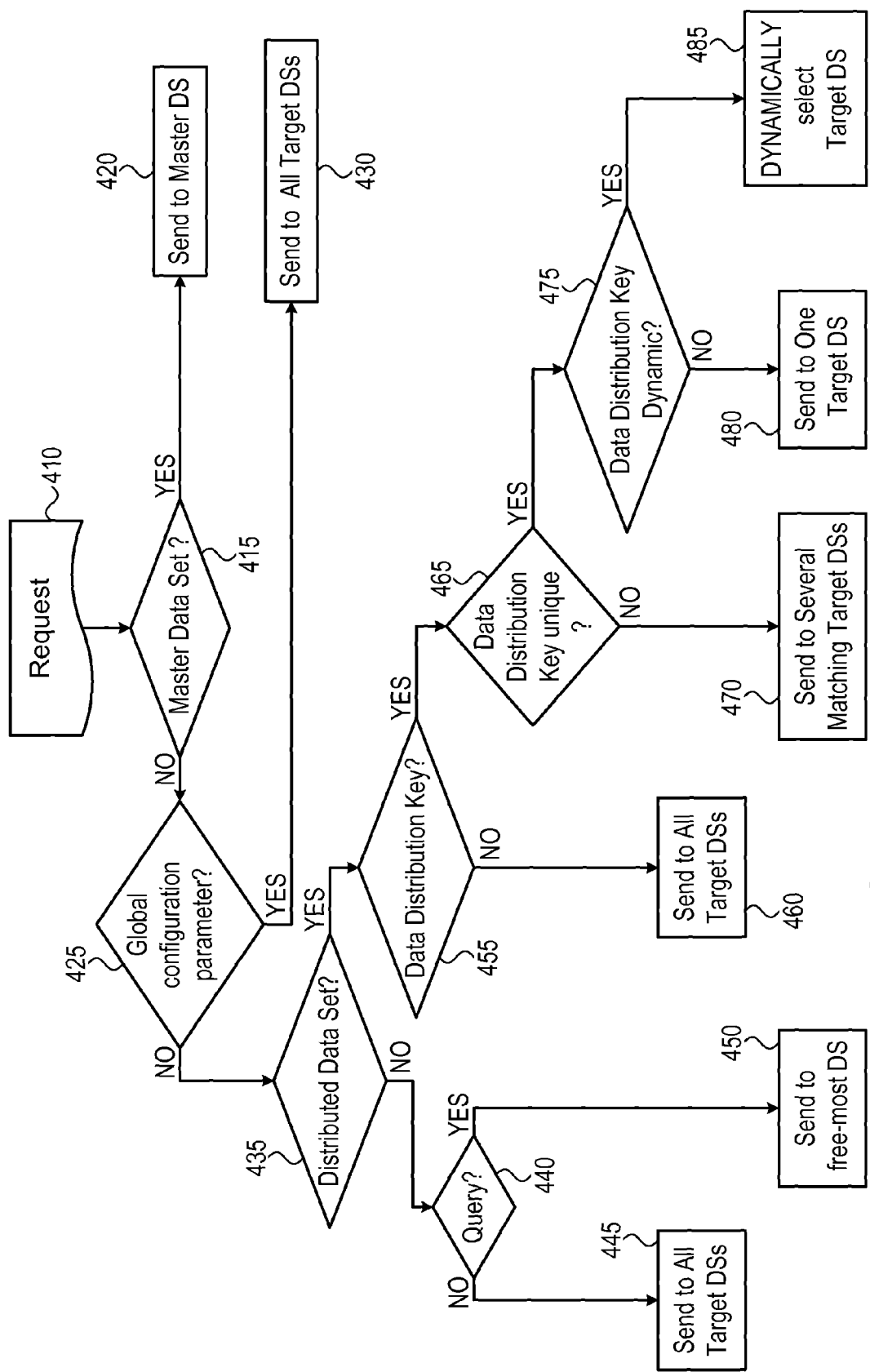
FIG. 4 shows a flowchart describing a method of according to embodiments of the invention.

Reference is now made to FIG. 4 that shows a flowchart describing a method according to embodiments of the invention. Unless explicitly stated, the method embodiments described herein are not constrained to a particular order or sequence, accordingly, embodiments of the invention are not limited by the order or arrangement of elements or operations shown in FIG. 4. Additionally, some of the described method embodiments or elements thereof can occur or be performed at the same point in time. Furthermore, some of the elements shown in FIG. 4 may be optional and/or omitted or, in some cases, skipped. In other embodiments, some of the operations or elements shown may be repeated. Accordingly, it will be understood that the flow and elements shown in FIG. 4 are an exemplary one embodiment, and various deviations from the flow may be possible without departing from the scope of the invention.

As shown by block 410, a method or flow may include receiving a request. For example, virtual data source system 300 may receive a request from one of client devices 110. Any operation related to a data source and/or database may be included in a request as shown by 410. For example, a request may be, or may include a request for information stored in a data source, e.g., details regarding an employee, a price of a product and the like. A request may be related to modifying information in a data source, e.g., update a price of a product. In other cases, a request may be related to modifying a configuration of a database, e.g., adding a column or row to a table. In yet other cases, a request may be related to metadata, e.g., a database software version may be requested or an IP address and the like.

A request received as shown by block 410 may be parsed, e.g., by parser 310. Parsing a request may include determining any relevant parameters or aspects of a request. In some embodiments, parsing a request received from a client, e.g., as shown by 410, may include determining a data set identification parameter. For example, a data indicated in (or relevant to) a request may be a table and a data set identification parameter may be a table name or other identification parameter that may uniquely or otherwise identify the table. A mapping or other construct may enable embodiments of the invention to determine on which data source a specific data set is stored. For example, a set of tables may be stored on a specific, possibly single server or data source. Accordingly, and as shown by block 415, the flow may include determining if the request relates to a master data set. For example, global information or metadata such a version or date of last update of a DBMS application or administrative personnel contact information and the like may be stored on a server or data source designated as master data source. Using parameters extracted from a request, e.g., a table name or a request type, and using a mapping, e.g., as stored in mapping data 226, mapping module 315 may determine that information requested in the request received as shown by 410 is stored in a table (or other data set) that is stored in a master server or data source. For example, mapping data 226 may include a table having two columns, the first of which stores a table name and the second stores a server or data source reference, e.g., an index. Accordingly and as shown by block 420, a request may be sent to a master data source (indicated as master DS).

As shown by block 425, the flow may include determining whether the request is related to a global configuration parameter. For example, a global configuration parameter may be a command related to a data definition language as known in the art, e.g., an addition of a row or column to a table or another modification of a table. A modification of a global configuration parameter (e.g., modifying a table) in a database or array of data sources may need to be reported to, and/or executed on, all data source which store the table (e.g., if the table is mirrored on several data sources). Accordingly, a table listing all data sources which may need to be notified or otherwise interacted with when a global configuration parameter is modified may be examined and, as shown by block 430, all relevant data sources may be provided with a request to modify the global configuration parameter. For example, mapping data 226 may include a table that maps global configuration parameters to relevant data sources. Mapping module 315 may examine such table, based on a parameter to be modified or manipulated, extract indices of data sources from the table and provide the indices to distributor 320 that may forward the request (e.g., as provided by parser 310) to all relevant data sources.

As shown by block 435, the flow may include determining whether the data set is a distributed data set. As described herein, a distributed data set may be a data set the content of which is divided or distributed across a number of data sources or servers as oppose to being stored in its entirety on one data source or duplicated on a number of data sources. Determining whether a data set is distributed may be based on a table or function, e.g., stored in mapping data 226. Accordingly, provided with a data set identification (e.g., a table name), mapping module 315 may examine mapping information and determine whether the data set is distributed.

As shown by block 440, the flow may include determining the type of request. For example, if it was determined that the data set is a non-distributed data set then if the request type is a request for information (e.g., a query) then, as shown by block 450, the request may be sent to a data source based on any suitable load balancing algorithm or scheme, for example, the least loaded server. In other cases, e.g., if the request type is related to an update of information, for example, updating a price of a product, then, as shown by block 445, the request may be sent to all relevant data sources.

As shown by block 455, the flow may include determining whether the request includes a data distribution key. For example, if it was determined that the data set related to the request is a distributed data set then mapping module 315 may determine, e.g., based on a table, which field in the request is to be designated as a data distribution key and may further determine whether such field was included in the request and/or whether the field includes a valid value. For example, a table or other construct (e.g., a linked list or a set of crossed referenced files) in mapping data 226 may indicate that a data distribution key of a specific data set is a column number. Among other information or parameters, parser 310 may extract from a request related to the specific data set the column number and table name and provide such parameters to mapping module 315. Module 315 may use the table name to determine (e.g., based on an association or mapping table) that the column number is to be used as a data distribution key.

Accordingly, mapping module 315 may examine the provided column number. In some cases, the column number parameter does not contain a valid value or contains a predefined value indicating that a valid value was not found in the request.

Embodiments of the invention may distribute a request to a plurality of data sources. For example and as described herein, a single request may be sent to a number of data sources, e.g., when updating a table that is cloned, duplicated or mirrored on a number of data sources. In other cases, a plurality of requests may be generated based on a respective plurality of data distribution key values and the plurality of requests may be sent to a plurality of data sources that may, in turn, be selected based on the plurality of data distribution key values. For example, based on a number of values assigned to a data distribution key, a number of data sources may be selected to receive potions of a request. In other cases, a request may be used to generate a number of requests that may differ from one another, e.g., in one or more parameters. In some cases, a plurality of portions of a request may be sent to a plurality of data sources, e.g., based on a mapping of a plurality of data distribution key values. For example, a data distribution key may be determined to be a row number and request may include requesting information in all rows from ten to twenty (10 to 20). A mapping data may indicate that content in rows ten to fifteen (10 to 15) is stored on a first data source and content included in rows sixteen to twenty (16 to 20) is stored on a second data source. Accordingly, system 300 may generate two requests that may be portions of an original request where a first of the two requests or portions may be a request for information included in rows ten to fifteen and such first request may be sent to the first data source and a second of the two requests or portions may be a request for information included in rows sixteen to twenty and such second request may be sent to the second data source.

In some embodiments, if parser 310 fails to find a valid parameter value in an incoming request then parser 310 may set the parameter value to a predefined value, e.g., NULL. Accordingly and as shown by block 460, if no data distribution key value is determined, the request may be sent to all relevant data sources. For example, the data distribution key value may iteratively or otherwise set to all values in a range of possible values, in each iteration, a table that maps data distribution key values to data sources may be examined and the request may be sent to one or more data sources based on the mapping or association in the table. Accordingly, sending the request to all relevant data sources as shown by block 460 may be an iterative process.

As shown by block 465, the flow may include determining whether the data distribution key value is unique. For example, a data distribution key may be a specific, unique value or number or it may be a range, e.g., 120 to 150 or it may be a logical expression, e.g., all odd numbers from 10 to 30. As shown by block 470, if the data distribution key includes, indicates, represents, or may be substituted by, a range of values, then the data distribution key may be substituted by the range or set of values, a respective set of data sources may be determined and the request may be sent to the respective set of data sources. For example, an iterative process of substituting the data distribution key value, determining a data source and sending the request to the determined data source may be performed.

As shown by block 475, the flow may include determining whether the data distribution key value is a dynamic value. For example, rather than indicating a unique value, a range of values or values based on a logical expression, a data distribution key or another parameter (that may be included in the request) may indicate that the data distribution key value is to be dynamically determined as shown by block 485. Any logic, system or module may be used to dynamically determine a data distribution key value. For example, a module, unit device or system external to system 300 may be provided with any parameter or information, including a request, e.g., as received as shown by block 410, and may return one or more values to be used as a data distribution key value. Provided with such dynamically generated or provided data distribution key values, system 300 may select a destination data source based on the provided values and forward the request to the selected data sources. As shown by block 480, the flow may include sending a request to a specific data source. For example, if a data distribution key value is unique then a mapping (e.g., as described herein) of the unique value may enable selecting a specific, single data source to receive the request.

According to embodiments of the invention, prior art systems, configurations or setups may be converted, transformed or ported such that they may operate according to, or otherwise comply with, embodiments of the invention. A data migration process may be designed and performed such that users or clients of data or information stored on one or more data sources may maintain their work or usage of stored data uninterruptedly. For example, an organization currently using a number of data source may want to switch to use embodiments of the invention. Such switch may require a migration of all the data from a first storage to another storage. In other cases, a system or device such as system 300 may be placed between users and an existing setup or array of data sources, tables in such located system 300 may be updated according to the way data is stored on an existing array of data sources and users may be caused to interact with such located system 300 rather than with the array of data sources.

In some cases however, data may need to be moved from a source storage to a destination storage (e.g., copied or duplicated, at least during a first stage). Data copied from a source storage may be arranged on a destination storage according to any scheme, logic or parameters. For example, based on various considerations, some of the data sets copied may be distributed across a number of data sources, e.g., to increase efficiency, speed etc. Generally, a transition of a system or setup from a prior art system to a system and method of operation according to embodiments of the invention may include causing users and/or applications in an organization to interact with a system such as system 300 and further configuring the system 300 to operate as described herein if data requested has already been ported (e.g., copied to a new location and possibly organized, e.g., distributed according to configuration parameters) and to forward requests for data not yet ported or copied to old or existing data sources, namely, data sources used prior to an introduction of a system or method according to embodiments of the invention.

As described herein, a request (e.g., as shown by 360) may be received and processed (e.g., received and processed by system 300, as described herein) and a number of requests (e.g., as shown by 370) may be sent to a number of data sources based on the received and processed request. In some cases, a number of portions of the request may be sent to a number of data sources. In other cases, a number of requests may be generated based on processing a received request and the number of such generated requests may be sent to a respective number of data sources. Accordingly, a number of responses (e.g., as shown by 371) from one or more data sources may be received, e.g., by system 300. Aggregator 340 may aggregate received responses into one or more responses and send aggregated responses, possibly as one response, to a client (e.g., as shown by 361). Accordingly, although a single request received from a client may be broken into a number of requests sent to a number of data sources, a single response may be provided to the client, otherwise described, system 300 may be transparent to the client.

Aggregation of responses may be based on various parameters, context or other aspects. For example, aggregator 340 may examine aggregation parameters (e.g., in aggregation parameters 227) that may be provided by parser 310, mapping module 315, distributor 320 and/or execution module 330. Aggregation parameters provided to aggregator 340 may include any parameter, data or information that may be required in order to aggregate or combine a number of responses into one or more responses. For example, any data or parameters extracted from a request received from a client may be stored in aggregation parameters (e.g., in aggregation parameters 227) and provided to aggregator 340. Other parameters or data, e.g., stored in aggregation parameters 227 may be determined based on processing a request from a client or based on a distribution of requests to data sources. Information provided to aggregator 340 may be, for example, any information related to threads spawned or executed by execution module 330, e.g., thread identification (thread ID), memory location or addresses associated with a thread (e.g., a location in memory where a thread stores a response received from a data source) and the like.

In a first case or scenario, aggregator 340 may simply forward received responses (e.g., as shown by 371) to a client. For example, aggregation parameters 227 may comprise an association of a thread (e.g., using a thread ID) and a client (e.g., an IP address and port number or socket identification associated with the client node). Aggregation parameters 227 may further indicate that no special processing or formatting of the response are required. For example, in the case where an original request (e.g., as shown by 360) for a list of employees that does not indicate the provided list is to be sorted (e.g., by employee name) or that a single list in a single response is expected, aggregator 340 may simply send (or forward) responses as received (e.g., as shown by 371). For example, using inter process communication (IPC) or other means or schemes, a thread may notify aggregator 340 that a response (or part thereof) has been received from a data source. Aggregator 340 may examine aggregation parameters 227, determine to which client the response is to be sent (e.g., based on an association of thread ID with a client and/or client parameters) and send the response, possibly as received, to the client.

In another case or scenario, information in a response may need to be sorted. For example, an original request from a client may indicate a sort of information in the response is required, e.g., the original request may include an SQL "ORDER BY" clause. For example, a request for a list of employees in an organization may indicate the list in the related response is to be sorted (e.g., according to an employee name), accordingly, an indication of a required sort may be inserted into aggregation parameters 227, e.g., by parser 310. In such case, multiple requests sent to data sources based on an original request from a client may all indicate that a sorted list is to be provided as a response. Accordingly, a number of sorted lists may be received, e.g., as shown by 371.

In such case, a sorted response to the client may need to be compiled based on responses received from a number of data sources. For example, the request for a sorted list of employees may be broken into several requests of a sorted list of employees sent to several data sources, e.g., if the list or table of employees is a distributed data set as described herein.

Accordingly, a number of responses, each comprising sorted information may be received. Based on information in aggregation parameters 227, aggregator 340 may determine the number of data sources to which relevant requests were sent and/or the number and identification of threads that were invoked in relation to the original request. For example, the number of threads invoked with relation to an original request received from a client may be entered into aggregation parameters 227. Aggregator 340 may compile a sorted list of employees based on responses (or lists) provided by a number of data sources, e.g., through or by a number of threads.

In one embodiment, to generate a sorted list based on a number of responses (received from a number of data sources, e.g., by a respective number of threads) aggregator 340 may wait until at least a part of a response was provided by all threads involved with the original request. Once at least part of a response was received from all data sources, aggregator 340 may commence compiling a response. Aggregator 340 may examine responses from all data sources and select to insert data from such responses into a response that will be sent to the client (e.g., as shown by 361) based on the sorting criteria (that may be indicated in aggregation parameters 227). For example, if a sort by an employee name is required, aggregator 340 may perform a lexicographic compare of entries in responses from a plurality of data sources and select the entry having the minimal value. For example, a table of employee names may be distributed, e.g., based on departments, to a number of data sources. Accordingly, a request from a client for a sorted list of employee names (e.g., as shown by 360) may cause system 300 to send a number of requests for a sorted list of employee names (e.g., as shown by 370). In such case, a number of responses (e.g., as shown by 371) each including a sorted list of employee names and each related to a different department may be received. Aggregator 340 may examine the responses and generate a response to the client by selecting entries in the responses according to the sorting criteria.

For example, a first list received from a first data source, e.g., of employees in the sales department, may include Abraham, Brown and Cohen. A second list received from a second data source, e.g., of employees in the research and development (R&D) department may include Adrian, Bailey and Cameron. By lexicographically sorting such two lists, aggregator 340 may produce the sorted list that may be: Abraham, Adrian, Bailey, Brown, Cameron and Cohen. Accordingly, a sorted list, that may be included in a response to a client, may be generated or produced based on a plurality of sorted lists included in a plurality of responses received from a plurality of data sources. Otherwise described, to generate a response to a client, a plurality of lists received from a plurality of data sources, each sorted based on a criteria may be merged into single list sorted by the same criteria.

In yet another embodiment, a request may indicate a grouping is required or requested. For example, an original request received from a client (e.g., as shown by 360) for employee names in an organization may indicate the names provided in a response are to be grouped according to departments, for example, an original request from a client may include an SQL "GROUP BY" clause or operator that indicates the grouping is to be done according to departments. Assuming the list of employees is a distributed data set, requests for employee names grouped by departments may be sent to data sources associated with the list of employees. However, in order to improve the aggregation process of responses received from a plurality of data sources, system 300 may add an operator or clause to an operator or clause in an original request received from a client.

In other cases, system 300 may replace an operator or clause in an original request received from a client. For example, if the list of employees is distributed according to employee names (e.g., names starting with "A" to "J" are stored on a first data source and names starting with "K" to "Z" are stored on a second) than records of employees from a number of departments may be stored on both the first and second data sources. In such case, rather than requesting a list of employee names grouped by departments from each of the data sources (namely, using the same operator, clause or parameter included in an original request from a client), system 300 (e.g., based on output from mapping module 315 and/or logic in distributor 320 or parser 310) may request lists of employee names from a number of data sources sorted by department. Accordingly, the clause, parameter or operator of "GROUP BY" received from a client may be replaced by "SORT BY" by system 300. Accordingly, lists of employee names sorted according to departments may be received from a number of data sources. Aggregator 340 may examine such sorted lists and compile a list of employees where, in the compiled list, employees are grouped by departments. To do that, aggregator 340 may collect, according to the sorting in the responses, entries. For example, aggregator 340 may extract all employee names of a first department in a first response, then extract all employee names of the first department in a second response and so on and insert such employee names into a list that is to be provided as a response to a client. Next, aggregator 340 may extract all employee names of a second department in the responses and insert the names into the response list. Accordingly, by using a plurality of sorted lists aggregator 340 may generate a list according to a grouping. It will be realized that in other cases, other parameters or operators in a request received from a client may be replaced or modified prior to sending the request to one or more data sources. In other embodiments, a parameter or operator may be added to an original request in order to generate a request to a data source.

In yet other embodiments, scenarios or cases, a number of requests for a number of item types or for information in a number of data sets may be generated based on a request from a client related to a single item type or related to a single data set. For example, a client may request a list of employee names and, for each employee, the name of the department with which the employee is associated. However, the list or table of employees may be stored on a first set of data sources and, rather than a department name, only a department identification code may be associated with employees in such list or table. Another table, possibly stored on a second set of data sources, may provide a mapping of departments identification codes to department names. Accordingly, to satisfy a request as above (for a list of employee names and associated department names), system 300 may generated at least two different types of requests. A first request (that may be sent to one or more data sources, e.g., based on the distribution of the relevant data set) may be a request for a list or table of employee names or records and second request may be for a table that provides a mapping of department identification codes to department names.

Accordingly, aggregator 340 may be provided with two types of results, e.g., in the example above, one related to employees and another related to departments. Aggregator 340 may use such two types of responses to generate a response to a client. For example, aggregator 340 may substitute the department identification code in the list of employees by the appropriate name based on the department list or table.

In another example, a client may request an average salary of employees in an organization. As before, the list or table of employees and their respective salaries may be distributed. Data sources may provide, based on a request, an average salary of employees. However, each one of the data source may only provide the average salary of employees as stored on that one data source. Clearly, a straight forward summation of the averages received from a number of data sources would result a wrong average, for example, a first average received from a first data source may be related to 250 employees and a second average received from a second data source may be related to only 10 employees, accordingly, summing the two averages may not be done to produce the correct average.

In such case, e.g., based on parsing the request received from the client and determining an average is required, system 300 may add an operator to requests sent to data sources to request, in addition to an average, also the number of employees with which the average is associated. Provided with both a plurality of averages and a respective number of items (e.g., employees) associated with each of the averages, aggregator 340 may compute a weighted average (e.g., by associating each average a weight according to the number of associated items) and such weighted average may be provided in a response to a client. Accordingly, based on processing a request from a client, system 300 may add an operator or clause to related requests sent to data sources and, based on a parameter, operator or clause in a request from a client and information received from data sources, system 300 may perform a calculation to generate a response to a client.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of processing a request, the method comprising:
    parsing a request received from a client to determine a data set identification parameter;
    determining, based on the data set identification parameter, the associated data set is a distributed data set;
    designating, by a receiver of the request, a field included in the request as a distribution key;
    selecting, based on a value of the distribution key, at least one data source; and
    sending at least a portion of the request to a selected data source;
    wherein the method further comprises determining, based on the data set identification parameter, whether the associated data set is a non-distributed data set and, if the data set is a non-distributed data set then:
        if the request is related to a retrieval of data, then selecting a data source based on a load balancing scheme, and
        if the request is related to an update of information, then sending the request to all data sources associated with the data set.

2. The method of claim 1, comprising dynamically associating a plurality of values with the distribution key and respectively selecting a respective plurality of data sources to receive at least a portion of the request.

3. The method of claim 1, comprising associating a data source with a range of values and, if the value of the distribution key is included in the range of values, then sending the request to the associated data source.

4. The method of claim 1, wherein a selected data source is one of: a master data source, a mirrored data source and a distributed data source.

5. The method of claim 1, comprising calculating an index based on the value of the distribution key and sending the request to a data source associated with the index.

6. The method of claim 1, wherein designating a field as a distribution key is based on an association of a data set identification parameter with a field included in the request.

7. The method of claim 5, wherein calculating the index comprises providing the value of the distribution key as input to a hash function.

8. The method of claim 5, comprising using a mapping table to associate the index with the selected data source.

9. The method of claim 5, comprising using the value of the distribution key as an index.

10. The method of claim 1, comprising generating a request to a data source by replacing a grouping operator in the received request by a sorting operator.

11. An article comprising a non-transitory computer-readable storage medium, having stored thereon instructions, that when executed on a computer, cause the computer to:
    parse a request received from a client to determine a data set identification parameter;
    determine, based on the data set identification parameter, the associated data set is a distributed data set;
    designate a field included in the request as a distribution key;
    select, based on a value of the distribution key, at least one data source; and
    send at least a portion of the request to a selected data source;
    wherein the instructions when executed further result in determining, based on the data set identification parameter, whether the associated data set is a non-distributed data set and, if the data set is a non-distributed data set then:
        if the request is related to a retrieval of data then selecting a data source based on a load balancing scheme, and
        if the request is related to an update of information, then sending the request to all data sources associated with the data set.

12. The article of claim 11, wherein the instructions when executed further result in dynamically associating a plurality of values with the distribution key and respectively selecting a respective plurality of data sources to receive at least a portion of the request.

13. The article of claim 11, wherein the instructions when executed further result in associating a data source with a range of values and, if the value of the distribution key is included in the range of values, then sending the request to the associated data source.

14. The article of claim 11, wherein a selected data source is one of: a master data source, a mirrored data source and a distributed data source.

15. The article of claim 11, wherein the instructions when executed further result in calculating an index based on the value of the distribution key and sending the request to a data source associated with the index.

16. The article of claim 11, wherein the instructions when executed further result in designating a field as a distribution key is based on an association of a data set identification parameter with a field included in the request.

17. The article of claim 15, wherein calculating the index comprises providing the value of the distribution key as input to a hash function.

18. The article of claim 15, comprising using a mapping table to associate the index with the selected data source.

19. The article of claim 11, comprising using the value of the distribution key as an index, the index identifying a data source.

20. The article of claim 11, comprising generating a request to a data source by replacing a grouping operator in the received request by a sorting operator.

\* \* \* \* \*